US011620312B2

(12) United States Patent
Thakur et al.

(10) Patent No.: US 11,620,312 B2
(45) Date of Patent: Apr. 4, 2023

(54) METHOD AND SYSTEM FOR PROCESSING WRITE QUERIES IN AN APPLICATION PROGRAMMING INTERFACE BASED ON DECLARATIVE SCHEMAS FOR INDIVIDUAL SERVICES

(71) Applicant: INTUIT INC., Mountain View, CA (US)

(72) Inventors: Aveer Ratan Thakur, Mountain View, CA (US); Michael J. Kogan, San Diego, CA (US); Banani Medhi, San Diego, CA (US); Peter Allen Vogel, Santa Clara, CA (US)

(73) Assignee: INTUIT INC., Mountain View, CA (US)

( * ) Notice: Subject to any disclaimer, the term of this patent is extended or adjusted under 35 U.S.C. 154(b) by 86 days.

(21) Appl. No.: 16/997,367

(22) Filed: Aug. 19, 2020

(65) Prior Publication Data

US 2022/0058210 A1   Feb. 24, 2022

(51) Int. Cl.
| | | |
|---|---|---|
| *G06F 16/00* | (2019.01) | |
| *G06F 16/28* | (2019.01) | |
| *G06F 16/248* | (2019.01) | |
| *G06F 9/54* | (2006.01) | |
| *G06F 16/2458* | (2019.01) | |
| *G06F 16/2455* | (2019.01) | |

(52) U.S. Cl.
CPC ............ *G06F 16/283* (2019.01); *G06F 9/546* (2013.01); *G06F 16/248* (2019.01); *G06F 16/2455* (2019.01); *G06F 16/2474* (2019.01)

(58) Field of Classification Search
CPC .... G06F 16/283; G06F 9/546; G06F 16/2455; G06F 16/2474; G06F 16/248; G06F 9/547
See application file for complete search history.

(56) References Cited

U.S. PATENT DOCUMENTS

| | | | |
|---|---|---|---|
| 11,182,354 B1* | 11/2021 | Patel | ..................... G06F 16/116 |
| 2014/0280703 A1* | 9/2014 | Vaks | ................... H04L 67/1001 709/217 |
| 2018/0234514 A1* | 8/2018 | Rajiv | ...................... G06F 9/546 |
| 2020/0034375 A1* | 1/2020 | Tung | ..................... G06F 16/248 |
| 2021/0232604 A1* | 7/2021 | Sundaram | ........... G06F 16/2322 |

* cited by examiner

*Primary Examiner* — Paul Kim
(74) *Attorney, Agent, or Firm* — Patterson + Sheridan, LLP

(57) ABSTRACT

Certain aspects of the present disclosure provide techniques for processing north-south queries in an application programming interface (API) generated for a plurality of associated services. The method generally includes receiving a request to invoke a function exposed by a first service in the API, wherein the function commits data to one or more data repositories. A data record is generated by the first service based on the received request based on a data object definition and a service definition for the first service. A message is generated including the generated data record and an indication that the message is to be consumed by a data lake processing system to commit data to a data lake. The message is published on a message bus for consumption by the data lake processing system.

16 Claims, 6 Drawing Sheets

METHOD AND SYSTEM FOR PROCESSING WRITE QUERIES IN AN APPLICATION PROGRAMMING INTERFACE BASED ON DECLARATIVE SCHEMAS FOR INDIVIDUAL SERVICES

INTRODUCTION

Aspects of the present disclosure relate to processing queries in an application programming interfaces (APIs) using object schemas, and more specifically to processing write queries in an API accessible through a graph generated from declarative schemas associated with each of a plurality of services.

BACKGROUND

Application programming interfaces (APIs) generally expose various routines and methods to software developers for use in obtaining and modifying data using features of a software application. These APIs may be accessible programmatically (e.g., as function calls programmed in an application or function library) or via a web resource for web-based applications. Web-based applications can invoke functionality exposed by an API, for example, using a Representational State Transfer function call (a RESTful function call). A RESTful call generally uses HTTP requests to invoke a function exposed by a web-based API and provide data to the invoked function for processing. In other cases, web-based applications can invoke API functions using queries encapsulated in an HTTP POST request, a Simple Object Access Protocol (SOAP) request, remote procedure call protocols (e.g., gRPC), or other protocols that allow client software to invoke functions on a remote system.

RESTful API design imposes a significant challenge to translate real-world noun/verb conventions into the limited verbs of the HTTP protocol (GET, POST, PUT, PATCH, DELETE) and the nouns of the problem domain handled by a given service. Differences, however minor, in the conventions adopted by individual services can lead to significant challenges in the user interface layer of an application that relies upon the individual service APIs. The use of RESTful services also leads to various inefficiencies such as over-fetching, in which data about a specific object in excess of what is needed to perform an action is retrieved, and underfetching, in which needed data about objects referenced by an initial data fetch is not retrieved and subsequent calls to the server may need to be performed.

Accordingly, techniques are needed to efficiently process read and write requests in APIs.

BRIEF SUMMARY

Certain embodiments provide a method for processing requests in an application programming interface (API). The method generally includes receiving a request to invoke a function exposed by a first service in the API, wherein the function commits data to one or more data repositories. A data record is generated by the first service based on the received request based on a data object definition and a service definition for the first service. A message is generated including the generated data record and an indication that the message is to be consumed by a data lake processing system to commit data to a data lake. The message is published on a message bus for consumption by the data lake processing system.

Further embodiments provide a system including a processor and a memory. The memory generally stores instructions which, when executed by the processor, performs an operation for processing requests in an application programming interface (API). The operation generally includes receiving a request to invoke a function exposed by a first service in the API, wherein the function commits data to one or more data repositories. A data record is generated by the first service based on the received request based on a data object definition and a service definition for the first service. A message is generated including the generated data record and an indication that the message is to be consumed by a data lake processing system to commit data to a data lake. The message is published on a message bus for consumption by the data lake processing system.

Still further embodiments provide a method for processing requests in an application programming interface (API). The method generally includes receiving a request to invoke a function exposed by a first service in the API, wherein the function is configured to commits data to one or more data repositories. An object write message is published on a message bus to invoke a function to generate one or more data records associated with objects defined in a data object definition and a service definition for a second service referenced by the data object definition. A data record is generated based on the received request, a data object definition and a service definition for the first service, and identifiers of the generated one or more data records associated with objects defined in the data object definition and the service definition for the second service. A message is generated, the message including the generated data record, an indication that the message is to be consumed by a data lake processing system to commit data to a data lake, and versioning information identifying a version of the data object definition used in generating the data record. The message is published on the message bus for consumption by the data lake processing system.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
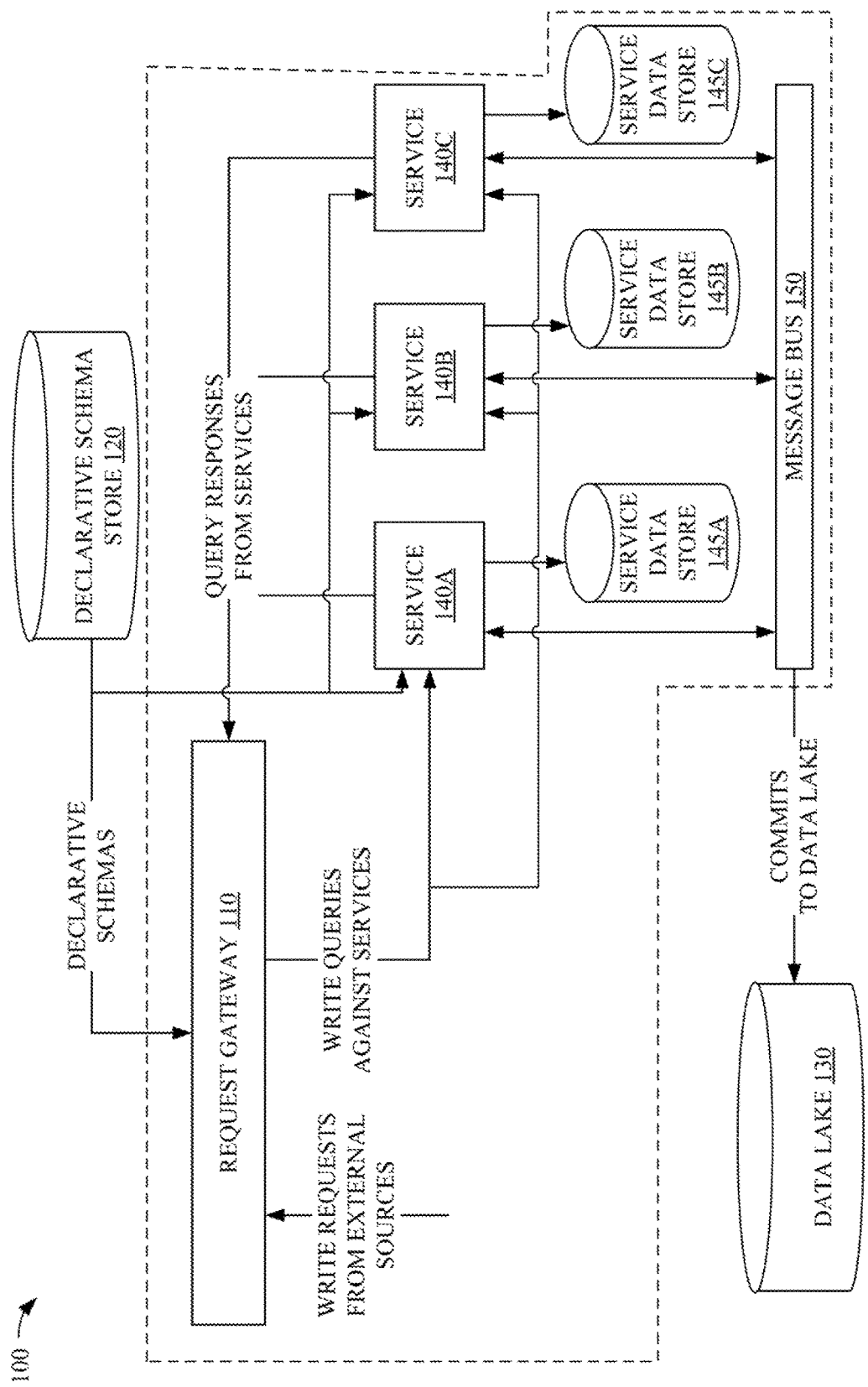
FIG. 1 depicts an example computing environment in which write (north-south) queries are satisfied in an API generated based on declarative schemas.

Application programming interfaces (APIs) for software architectures structured as a collection of services generally expose methods and procedures that software developers can use to build software applications using features provided by one or more of those services. Generally, each service in the collection of services may be built to implement a specific function or related set of functions. By implementing separate services for specific functions or related sets of functions, the maintainability of an application may be improved, as updates to a function may affect the service that implements the updated function and may not affect other services that use the updated function, assuming that the underlying contract defining the inputs and outputs of the updated function has not changed.

In some cases, each service may expose an API that allows other applications or services to invoke functions implemented by each service. The API may, for example, participate in a graph in which functions exposed in the API are represented as navigable paths through the graph starting from a root node representing an entry point into the API and terminating at a specific function to be invoked in the API. As the number of services in the collection of services increases, and as the number of functions exposed by each service increases, a graph representing the complete API of the system implemented by the various services may likewise increase in size.

In conventional systems, when functions are added, removed, or modified in a service in the collection of services, the API may be re-compiled and deployed to each of the services. While compiling and deploying an API may be a computationally inexpensive task for APIs structured as a smaller collection of services, increases in the number of services and the functions exposed by each service may cause the re-compilation and deployment of APIs to the collection of services to become more computationally expensive and time consuming. Further, in a rapid development and rapid deployment environment, where services are continually updated, updates to services may be performed before updated APIs are compiled and deployed to each of the services. In such a case, processing resources spent to compile and deploy an API may be wasted, as the resulting compiled API may not include updates performed while the API was being compiled and deployed.

APIs may expose functionality in a variety of manners, such as using a Representation State Transfer (REST) model, a graph projection, and other projections of the functionality exposed by the API. While exposing the functionality of an API using various models or projections allows external services and applications to invoke functions exposed by the API using a variety of techniques, the API itself may be built using a definitional paradigm that may complicate or obfuscate the features of the API.

For example, the API may be built using a nouns-only REST approach, where entities defined as nouns in the API are acted upon using standard Hypertext Transfer Protocol (HTTP) verbs (e.g., HTTP POST, GET, PUT, or DELETE). Because the actions of the API may be limited to functions of creating (corresponding to HTTP POST), reading (corresponding to HTTP GET), updating (corresponding to HTTP PUT), and deleting (corresponding to HTTP DELETE), the functions invoked to perform simple operations, such as requesting that an e-mail be sent or that a calculation be performed on a transaction, may be represented by non-intuitive modifications of an underlying REST object interpreted by business logic for a service as a requirement to perform these operations. Therefore, a REST-based API may cause specific fields to be modeled into entities processed by the API, which may complicate the API by tightly coupling a definition of a service with a definition of the API.

Modern API systems, such as GraphQL seek to solve the problems of REST by defining a single, coherent API "graph" that is orchestrated to multiple microservices implemented using REST, SOAP, gRPC, or other protocols. Defining a single graph may solve many problems in handling differences in the conventions adopted by different services. However, defining a single, coherent API "graph" may also introduce an additional "layer" in the system which must be maintained and kept consistent with the capabilities of the underlying microservices as they evolve. This is especially challenging in an environment with many microservices and a fast release cycle where any given microservice may be rapidly released (e.g., multiple times per day or week).

Further, services or microservices may rely on data entities that are defined by each service. In a multilayer system where different objects for the same data entity are defined, multiple layers of mappings may be maintained, and each layer in the system may maintain its own business logic that maps an input data object to an output data object. Requests in these APIs may involve north-south processing from a request gateway to one or more data repositories to write data to data repositories associated with different services in the API and east-west processing to satisfy a request based on data maintained across different services in the API.

To allow for services to be independently maintained and loosely coupled to each other, APIs may be generated and defined based on declarative schemas associated with each service in a collection of services. Generally, a declarative schema may include information defining the functions exposed by a service and the objects used by functions exposed by the service. Each individual service, defined by its own declarative schema, may have knowledge of the data and operations exposed and performed by the service, but need not have knowledge of the data and operations exposed by other services in the collection of services. In these APIs, components of the API may be thought of in terms of a vertical layout (e.g., a north-south layout) in which a request gateway is at the top of the layout, the services exposed by the API are in the middle, and the data stores associated with the services are at the bottom. Components of the API may also be thought of in terms of a horizontal layout (e.g., an east-west layout) in which different services in the API may be on the same level in the vertical layout for the API. Queries may be defined in terms of vertical (north-south) processing from a request gateway to a data repository associated with the services in the API and horizontal (east-west) processing to combine data maintained across different services into a single object that can be returned to a requesting service. By defining queries in terms of north-south processing from a request gateway to a data repository associated with the services in the API, data may be committed to a global data lake for use in, for example, training machine learning models, while committing data to one or more local data repositories for use in satisfying read requests. By defining queries in terms of east-west processing, data maintained by independent services in the API may be stitched together such that services need not maintain definitions of data objects maintained by different services in order to satisfy a read request in the API.

Example Processing of North-South Queries in an Application Programming Interface Generated Based on Declarative Schemas for Services in a Collection of Services FIG. 1 illustrates an example computing environment 100 in which north-south queries are processed in an application programming interface (API) generated based on declarative schemas associated with each service in a collection of related services. The API may be implemented by the components in computing environment 100 implemented within the dotted line illustrated in FIG. 1: request gateway 110, the services 140A-140C, the service data stores 145A-145C associated with the services 140A-140C, and message bus 150, as discussed in further details below. The API may be defined, as discussed in further detail below, based on one or more declarative schemas stored in declarative schema 120.

As illustrated, computing environment 100 includes a request gateway 110, declarative schema store 120, data lake 130, and a plurality of services 140A-C (collectively, 140), each service 140 being associated with a service data store 145A-C, respectively.

Computing environment 100 illustrates the processing of north-south queries in an API generated from declarative schemas associated with individual services in a collection of related services and code implementing the portion of the API associated with each individual service in the collection of related services in a client-server deployment. It should be recognized that the processing of queries in APIs generated based on declarative schemas may be performed on a single physical computing device (e.g., a server), across a cluster of computing devices, in a virtualized environment in which services are hosted by virtual machines executing on one or a cluster of computing devices, or in any other computing environment in which an API can be generated and deployed for access and use by external software applications or services.

Request gateway 110 generally is representative of an single point of entry at which computing environment 100 receives a request to invoke a function exposed by one of the plurality of services 140 from an external source (e.g., an external service interfacing with the API exposed by computing environment 100, a software application executing on a client device, a web application executing on a remote server, etc.). Request gateway 110 can examine the received request against information defining the API to identify the one or more services to which the request is to be routed for execution. Upon receiving a response from the identified one or more services, request gateway 110 collects responses from the identified one or more services to produce a response for the requesting external source (e.g., an external client application). In some embodiments, request gateway 110 may receive a request from an external source for data from one service that references data handled by other services. To satisfy the request, request gateway 110 may make one or more further service calls to the appropriate services prior to providing a response to the external source.

In some embodiments, request gateway 110 may expose the API as a graph projection in which a graph query language is used to define a function invoked by a received request. The graph projection may be structured such that a node representing the request gateway 110 serves as the root node of the graph projection, and nodes at different levels of the graph represent different functions that can be invoked in the API. Any function in the API may be represented as a continuous navigable path through the graph projection of the API.

In some embodiments, request gateway 110 may traverse the graph projection of the API to determine if a received request is a valid request (i.e., is a continuous navigable path through the graph projection of the API). If request gateway 110 determines that the request is a valid function call, request gateway 110 can identify the service(s) invoked by the request and route the request to the identified service(s) for execution. Otherwise, if request gateway 110 determines that the request is not a valid function call (e.g., is not a continuous navigable path through the graph projection of the API, is a request that includes nodes in the graph projection or data that a user is not authorized to access, etc.), request gateway 110 can return an error message to the external service or application from which the request was received. In some embodiments, the graph projection may include north/south routing information used to route requests to the appropriate service. Generally, north/south routing information may include the request gateway 110 as the point of entry, or the north-most point in the API, and the routing information may indicate a route south from the request gateway 110 to the appropriate service(s) 140 and service data store(s) 145.

The request gateway 110 may expose a graph projection of an API that is programmatically built by composing the declarative schemas stored in declarative schema data store 120 defining each of the services 140 in computing environment 100. To compose the declarative schemas defining the services 140 into a graph projection of the API, request gateway 110 can examine the declarative schemas to identify references in an entity to entities associated with other services.

For example, suppose that an API exposes a function for obtaining an invoice, and the invoice entity references user information entities and invoice line item entities. Based on the definition of the invoice entity in the API, request gateway can generate a graph projection with a node for retrieving an invoice acting as a parent node to a node for retrieving user information entities and a node for retrieving invoice line item entities, which may be defined by separate services and may include one or more operations for obtaining an entire entity or specific data from an entity.

In some embodiments, each service 140 may define API operations in terms of input and output data that allows for API-only fields to be added to entities in the API. To do so, services 140 may be layered with a plurality of layers. These API-only fields may include, for example, fields that are used internally (e.g., by request gateway 110 or a particular service 140) to process a request but may not be exposed externally in data returned to an application or external service that requests data by invoking one or more functions in the API. A first layer of services may handle basic Create/Read/Update/Delete logic for defined entities. Higher-layer services may implement deeper business logic and may expose more complex operations that may or may not involve direct manipulation of the state of an entity (e.g., to send an invoice via e-mail or process a credit card transaction prior to generating and storing a sales receipt). Further, request gateway 110 may reference code that provides a resolver for the API-only fields and may use information defining API-only read operations that identify the entity to be resolved and the cardinality of the result (i.e., the number of entities returned in response to the API-only read operations).

Each declarative schema associated with a service generally includes information defining entities maintained by the service. For example, for a service that allows users to create, modify, and retrieve invoices, the service may maintain a definition of an invoice entity including the data elements that any invoice created or modified using the service includes. The information defining entities maintained by the service may include various variable types and references to "golden types" for which a standard definition is maintained across the services 140 in computing environment 100. These "golden types" may define an entity and a format in which data associated with that entity is to be stored. For example, "golden types" may include commonly used information throughout computing environment 100, such as phone numbers, postal addresses, e-mail addresses, national identity numbers, and the like, for which a standard definition is enforced across the services 140 in computing environment 100 allows for the interoperability of the services 140 and the data provided by these services. In some embodiments, entity types defined in a declarative schema may be associated with a defined enumeration of valid values, which may be used to build service controllers that ensure that data generated by the service complies with the enumeration of valid values (i.e., that the data is one of the enumerated valid values for a particular data point defined in the declarative schema) and to generate errors that cause the API to fail gracefully if a value does not conform to the enumeration of valid values.

In some embodiments, where appropriate, a declarative schema for a service may include references to entities maintained by other services in computing environment 100. To maintain segregated responsibility for maintenance and a loose coupling of each service in computing environment 100 so that non-contractual changes to one service in computing environment do not adversely affect the functionality of other services, a declarative schema for a service may reference entities in another service using a unique identifier of the service. Because details about entities maintained by other services are not included in the definition of the service, changes to entities maintained by one service may be implemented without modifying the declarative schemas associated with services that use entities maintained by the one service.

The declarative schema associated with a service may additionally include information defining the operations supported by the service. The operations supported by a service may be defined as verbs representing actions that can be performed by invoking the function exposed by the service using a function call defined in the API. Each verb may be associated with an input message and a response message. In this example, the input message may include information identifying data that is used to generate a query against a service data store 145. The input data may be, for example, one or more entities that are used to generate a query against a service data store 145 for an entity, such as a unique identifier associated with a record in a service data store 145 that the service is responsible for maintaining, or non-entity objects. The response message may include information identifying the data that is to be returned in response to invocation of the operation. The response message may be structured as a single entity, as a collection of entities (e.g., a list, array, etc. that is searchable and may be paginated), or as a non-entity object. In some embodiments, each operation may be defined in terms of one or more create, read, update, or delete (CRUD) operations that may be performed by the operation. For example, a read operation may be configured to allow only read operations, a save operation may be configured to allow create or update operations, and a delete operation may be configured to allow only delete operations. The information about the allowed operations, combined with information defining the entities maintained by the service, may allow for the generation of code that implements the operations defined in the declarative schema.

Declarative schema store 120 generally represents a data repository in which declarative schemas for each of the services 140 in computing environment 100 may be stored. Declarative schema store 120 may be structured as a flat data store, a versioned data store, a relational or non-relational database in which declarative schemas are stored as binary large objects (BLOBs), or the like. In some embodiments, to allow service definitions to roll back to a previous definition, declarative schema store 120 may version each copy of a declarative schema for a service and allow a developer of a service 140 to mark a version as a legacy, production, or pre-production version. In some embodiments, declarative schemas marked as a production version may be used by request gateway 110 to generate a publicly-facing version of the API, while declarative schemas marked as pre-production versions may be combined with other declarative schemas marked as production versions to generate a test version of the API.

Data lake 130 generally represents a data repository in which entities maintained by each of the services 140 in computing environment 100 may be stored. Data lake 130 may include a data lake processing system that is configured to listen for messages published on message bus 150 and commit data to a data repository in which data is stored but isolated from operational use. Generally, as discussed in further detail below, data stored in the service data stores 145A-145C may be used operationally to service requests received at request gateway 110, while data stored in data lake 130 may be used outside of a production or operational environment for other purposes, such as training machine learning models to be used by an application, data analyses, and the like.

Generally, entities in data lake 130 may be structured according to an entity definition included in a declarative schema associated with one of the plurality of services 140 in computing environment 100. The format of data structures ingested for storage in data lake 130 may be defined according to a global data dictionary that includes information about each entity that is defined in the plurality of declarative schemas so that data consistency across various services may be enforced. Internal services 140 within computing environment 100 that rely on or otherwise reference data from other services may be guaranteed to receive data from data lake 130 or a service data store 145 in a particular format. Applications that use data from data lake 130, such as machine learning applications, may be guaranteed to receive clean data from data lake 130 (e.g., data objects conforming to a definition of a data object identified in the version of the data object definition used in creating the data object) without needing to guess at the contents of any data payload received from a service 140 or the format of the data in the data payload.

Data stored in data lake 130 may be generated according to a variety of data formats that may have varying features. For example, newer data formats may include data fields that are not found in older data formats and may remove data fields that were rarely used or are otherwise deprecated. Thus, each object stored in data lake 130 may include versioning information for the version of the schema that the object conforms to. A data dictionary, which includes information about all versions of the schemas used to define data stored in data lake 130, may be used by services 140 to interpret the data objects persisted to data lake 130 according to the appropriate schema.

Services 140 are representative of one or more services or microservices deployed in computing environment 100 to expose functionality to applications or services internal or external to computing environment 100. Services 140 may be deployed on individual physical machines, individual virtual machines, clusters of physical or virtual machines, containers executing on one or more virtual machines, or the like.

As discussed above, each service 140 may be associated with a declarative schema defining the entities and operations exposed by the service. When a service 140 receives a request from request gateway 110, service 140 may retrieve data from its associated service data store 145. The data retrieved from service data store 145 may be parsed to identify references to other entities that are to be resolved.

Generally, a reference to another entity to be resolved may include an entity identifier, which may be an identifier unique to computing environment 100 or a globally unique identifier. Based on the entity identifier, service 140 can generate a message to the service associated with the entity identified by the entity identifier to request resolution of an object based on one or more additional parameters included in the data retrieved from service data store 145. This message may be published on message bus 150 and consumed by the target service for processing. In response, the service 140 may receive a message, on message bus 150, including the requested data, and the service may replace references to the other entity in the data retrieved from a service data store 145 with the requested data included in the received message.

Service data store 145 generally provides a repository in which data associated with a particular service 140 is stored. Generally, service data store 145 may be designated a source of truth for data maintained by a service. When data is written to service data store 145, service 140 can emit a data commit message on message bus 150 to commit data to data lake 130, which, as discussed, may serve as a repository in which data maintained by the services 140 may be stored for use in various other applications, such as machine learning applications.

Message bus 150 generally represents a conduit through which services 140 perform inter-service communications (e.g., to invoke events at other services 140 to retrieve data from the appropriate service data stores 145) and notify data lake 130 of changes to data. Generally, message bus 150 may carry one or more messages defined according to message specifications defined for each of the services 140. In some embodiments, message bus 150 may broadcast messages for consumption by the service 140 identified in a header or body of a message. In other embodiments, message bus 150 may route messages published on the message bus by a service 140 to a target service identified in the header or body of a message.

Example Processing Write (North-South) Queries in an API Generated Based on Declarative Schemas In some embodiments, to process a write (e.g., a north-south) query in the API (e.g., a query that results in data being written to data lake 130 and/or one or more service data stores 145), a request gateway 110 may receive a request to invoke a function exposed by a first service 140*a* through the API. The request may generally include information identifying the first service 140*a*, information identifying one or more objects defined by the data object definitions and/or service definitions associated with the first service 140*a* to be written, and the data to be included in the one or more objects. Request gateway 110 can use the information included in the request to route the query to the first service 140A for processing.

At the first service 140A, a data record may be generated to satisfy the received request. The data record may be generated based on information included in the received request and the data object definition and the service definition for the first service. Generally, the data object definition may define various objects (or entities) maintained by the first service (e.g., in terms of object names, data encapsulated in each object, etc.), and the service definition may define functions exposed by the service and operations that the service can perform with respect to objects maintained by the first service and/or objects maintained by one or more other services. In cases where an object represented by the data record does not reference data objects maintained by other services 140 (e.g., services 140B and 140C illustrated in FIG. 1), the service 140A may generate a write request to commit the data record to the service data store 145A. As discussed, the data record committed to the service data store 145A may be used to satisfy read queries directed to the service 140A to retrieve the record. In some embodiments, as discussed in further detail below, the data record committed to the service data store 145A may be modified or deleted as needed.

Service 140A may further generate a message on the message bus to instruct a processor at data lake 130 to commit the data record to the data lake 130. In some embodiments, the message may include the data record and versioning information associated with a data object definition used to generate the data record. Generally, by including the versioning information associated with the data object definition used to generate the data record with the data record, data committed to the data lake 130 may be committed without needing to be converted to a standard format at the data lake 130. When consumers of data stored in data lake 130 retrieve data from data lake 130, the consumers can use the versioning information associated with each record stored in data lake 130 to identify the version of the data object definition used to generate the record and convert each record to a standard format for use. When data object definitions change or are updated, existing records in the data lake 130 need not be modified to comply with the updated data object definitions, which may reduce the amount of computing resources needed to maintain the data records at data lake 130.

In some embodiments, a north-south query directed to service 140A may include a request to write a data object that references data objects maintained by one or more other services 140B-140C. These referenced data objects may generally be written to the data stores associated with their respective services (e.g., service data stores 140B-140C) and/or to data lake 130. To satisfy the north-south query, service 140A can first determine whether the referenced data objects exist at the one or more other services 140B-140C.

For example, a request may include a global identifier of a service (e.g., a globally unique identifier (GUID) or universally unique identifier (UUID)) associated with a service in computing environment 100 that defines a data object and an identifier associated with the specific record that is referenced in the data object to be written via the north-south query. Service 140A can publish a message on message bus 150 requesting a service associated with the global identifier to return a data object having the associated identifier. In response, service 140A may consume a message placed on message bus 150 by the service associated with the global identifier. If the data object having the associated identifier exists at the service associated with the global identifier, the consumed message may include the data object having the associated identifier or an indication that the data object having the associated identifier exists at the service associated with the global identifier.

Otherwise, the consumed message may include a null data object or an indication that the data object having the associated identifier does not exist at the service associated with the global identifier. Based on this indication, the service 140A can generate one or more data records associated with these objects that are maintained by a different service, such as 140B or 140C. To generate these data records, service 140A can publish one or more messages on message bus 150 directed to the services that maintain the referenced data objects. The messages published on message bus 150 generally include information identifying the service that is to consume the message, an indication of the data object to be written by the identified service, and the data to be included in the data object. In some embodiments, the data to be included in the data object may include a record identifier for the data object to be written by the identified service.

After publishing the message to write the data objects to one or more of services 140B-140C, service 140A can write a record to the service data store 145A including the record identifier for the data object to be written by the identified service. In some embodiments, the record written to service data store 145A may be written without waiting for confirmation that the referenced data object(s) were written by services 140B and/or 140C to their respective service data stores 145B and/or 145C, which may accelerate the writing of data objects in computing environment 100. In some embodiments, service 140A may wait for confirmation that the message has been consumed and processed by the intended services 140B and/or 140C before generating the record written to service data store 145A. The confirmation may be received in a message published by services 140B and/or 140C on message bus 150 and may include the record identifier(s) for the data object(s) written to the service data stores 145B and/or 145C associated with the respective services 140B-140C.

In some embodiments, service 140A may generate write requests against the other services 140B-140C as a batch write instruction to instruct services 140B-140C to write a plurality of records to the respective service data stores 145B-145C. The batch write instruction may be published on message bus 150, and service 140A may monitor message bus 150 for a confirmation message generated by the other services 140B-140C indicating that the plurality of records were written to the respective service data stores 145B-145C. The message indicating that the plurality of records were written to the respective data stores 145B-145C may include record identifiers for each of the records written to the respective data stores 145B-145C. The record identifiers may be inserted into the data record generated by service 140A so that data is not duplicated in computing environment 100.

Generally, in processing north-south data requests, data may be written to service data stores by their respective services to satisfy read/write requests by other services in the computing environment 100 and to a data lake 130 for use outside of a production environment represented by computing environment 100. Data objects defined by a data object definition associated with a first service may reference, but not duplicate, data objects defined by a data object definition associated with a second service so that each service may be independently maintained and be loosely coupled. The inclusion of references to objects defined in data object definitions associated with other services may allow for the data object definitions associated with these other services to be independently updated without affecting the data object definition of a data object that references these objects associated with the other services.

Figure 2:
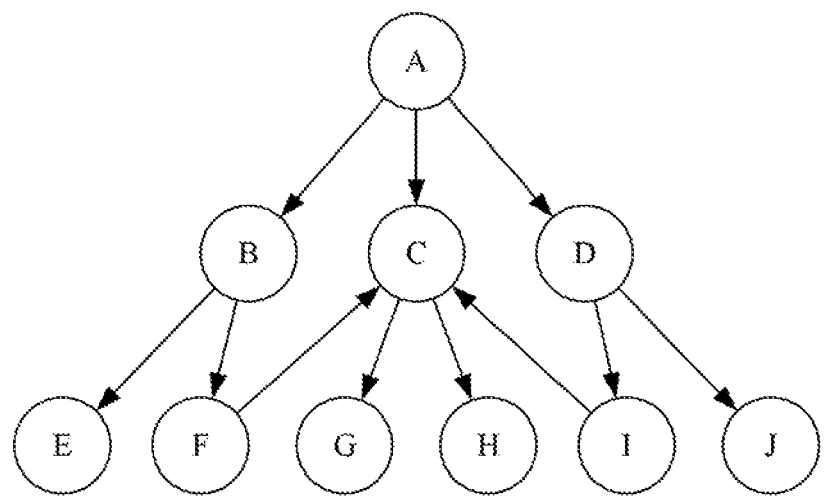
FIG. 2 depicts an example graph projection of an API generated based on declarative schemas for services in a collection of services.

Example Graph Projection of an Application Programming Interface in which Write (North-South) Queries are Processed FIG. 2 illustrates an example graph projection 200 of an application programming interface (API) that may be generated from declarative schemas and used to process read and write requests maintained by one or more services exposed by the API.

As illustrated, graph projection 200 of the API includes a root node, node A, that represents a point of entry into the API. Generally, requests to invoke a function may be received at a request gateway 110, which may correlate to the root node of the API. The root node of the API may reference subgraphs for a plurality of services exposed in the API. As illustrated, three services, represented by nodes B, C, and D, may be exposed by the API, and subgraphs representing the functions implemented by these services may be combined into graph projection 200. Nodes B, C, and D may represent a point of entry for invoking functions exposed by each of the services associated with nodes B, C, and D.

The service represented by node B in graph projection 200, as illustrated, exposes two functions, functions E and F. Function E may not reference data owned or defined by other services in the API, and thus function E may not have a connection in the graph projection 200 to other services exposed by the API. However, function F may be defined in a manner that references data objects owned and/or defined by the service represented by node C. For example, suppose that function F references data that is accessible through function G. Because node C represents a single point of entry into its associated service, a connection in graph projection 200 may be established between the node representing function F to node C representing the service through which function G is accessed.

Similarly, the service represented by node D in graph projection 200 exposes two functions, functions I and J. Because function J does not reference data owned or defined by other services in the API, the graph projection 200 may not include a connection between node J and any of nodes B or C associated with services exposed by the API. However, because function I references a data object that is accessible through a service associated with node C (e.g., objects accessible by invoking one of functions G or H), function I may have a connection to node C to connect the function to the service from which referenced data can be retrieved.

Figure 3:
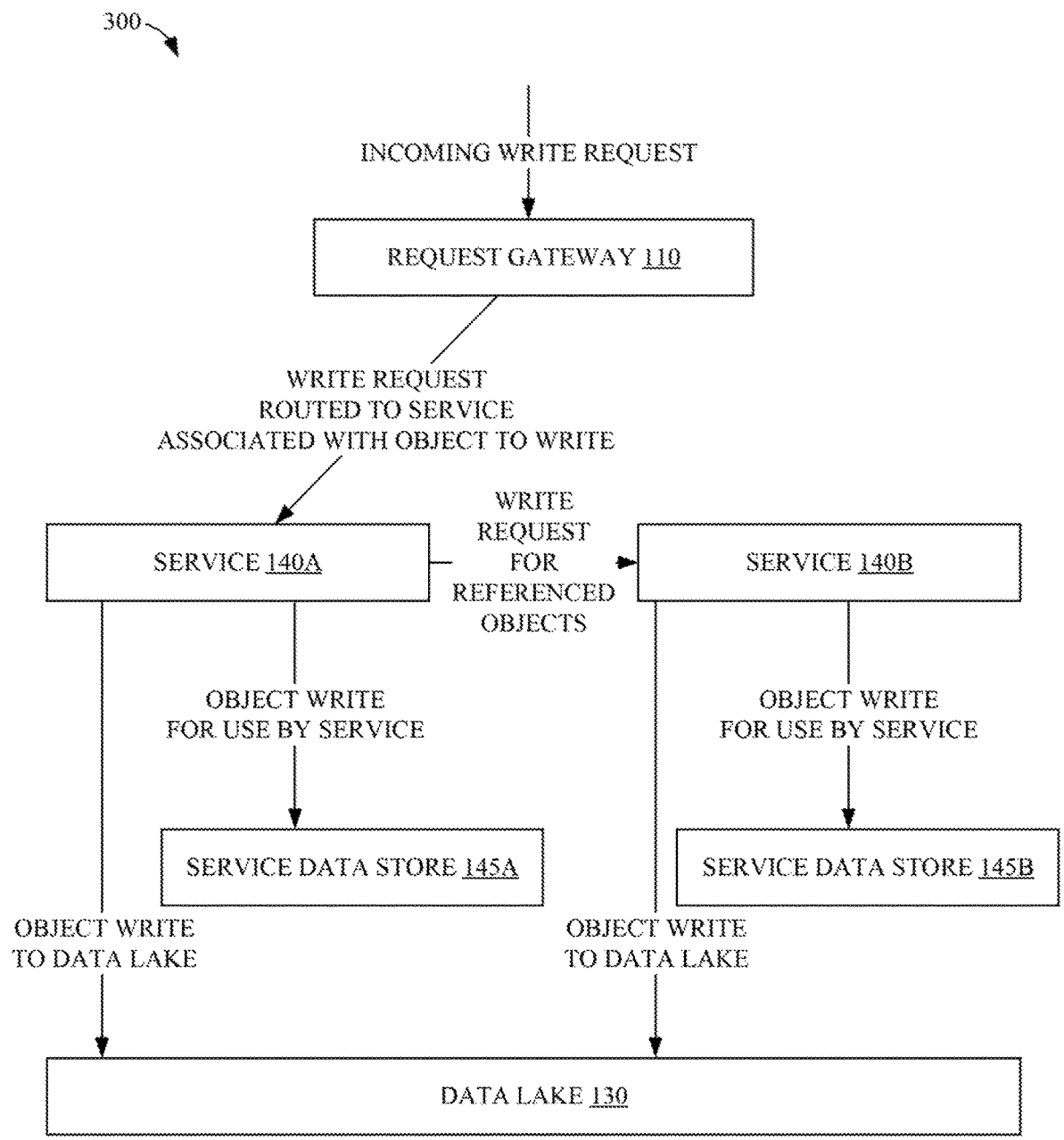
FIG. 3 depicts an example of processing a write (north-south) query in an API generated based on declarative schemas.

Example Routing of Write Queries in an API Generated Based on Declarative Schemas FIG. 3 illustrates an example vertical routing of a write request in an API generated based on declarative schemas for a plurality of services. Generally, a vertical (or north-south) routing of a write request may start with a write request being received at request gateway 110. The write request may be received at the request gateway 110 from an external application or service that interacts with an API that exposes functionality and data maintained by a plurality of services 140 in the API. As discussed, the request gateway 110 may represent a single point of entry for external applications or services to invoke functions and retrieve data maintained by a plurality of services within the API. For services that are peers in the API, communications between services may be effectuated by asynchronously by calling a function directly in one of the services exposed by the API or by placing a message on a message bus for consumption by a peer service without sending a message back to the request gateway 110 for processing and routing, which may improve the efficiency of intra-service communications in the API.

Request gateway 110 generally parses the incoming write request to identify the service which is to process the write request. In some embodiments, the request gateway 110 can identify the service which is to process the write request by traversing a graph projection of the API (e.g., graph projection 200 illustrated in FIG. 2) to identify the service that is to process the request, which may be the service in which the object to be written is defined. The request gateway routes the write request to the identified service associated with the object to write (e.g., as illustrated, to service 140A) for processing.

At service 140A, the request may be analyzed to identify referenced (child) objects that are to be written before the requested object can be written. If child objects are to be written, service 140A can generate one or more requests to write these child objects and route the requests to the appropriate services for execution. In this example, the requested object to be written by service 140A may reference an object that is maintained by service 140B (e.g., owned by or defined in a data object definition associated with service 140B). To write this object, service 140A can publish a message on a message bus, intended for consumption by service 140B, to write the referenced object to a service data store 145B associated with service 140B.

Generally, services 140A and 140B may write objects to service data stores 145A and 145B, respectively, and to data lake 130. Objects written to service data stores 145A and 145B may be used during regular operations to service requests made through the API. Meanwhile, objects written to data lake 130 may be isolated from operational use. As discussed, the objects written to data lake 130, which may include object definition versioning information with each object, may be used by other applications or services that need access to previously written data outside of a production or operational environment (e.g., to train machine learning models, perform data analyses, etc.).

Figure 4:
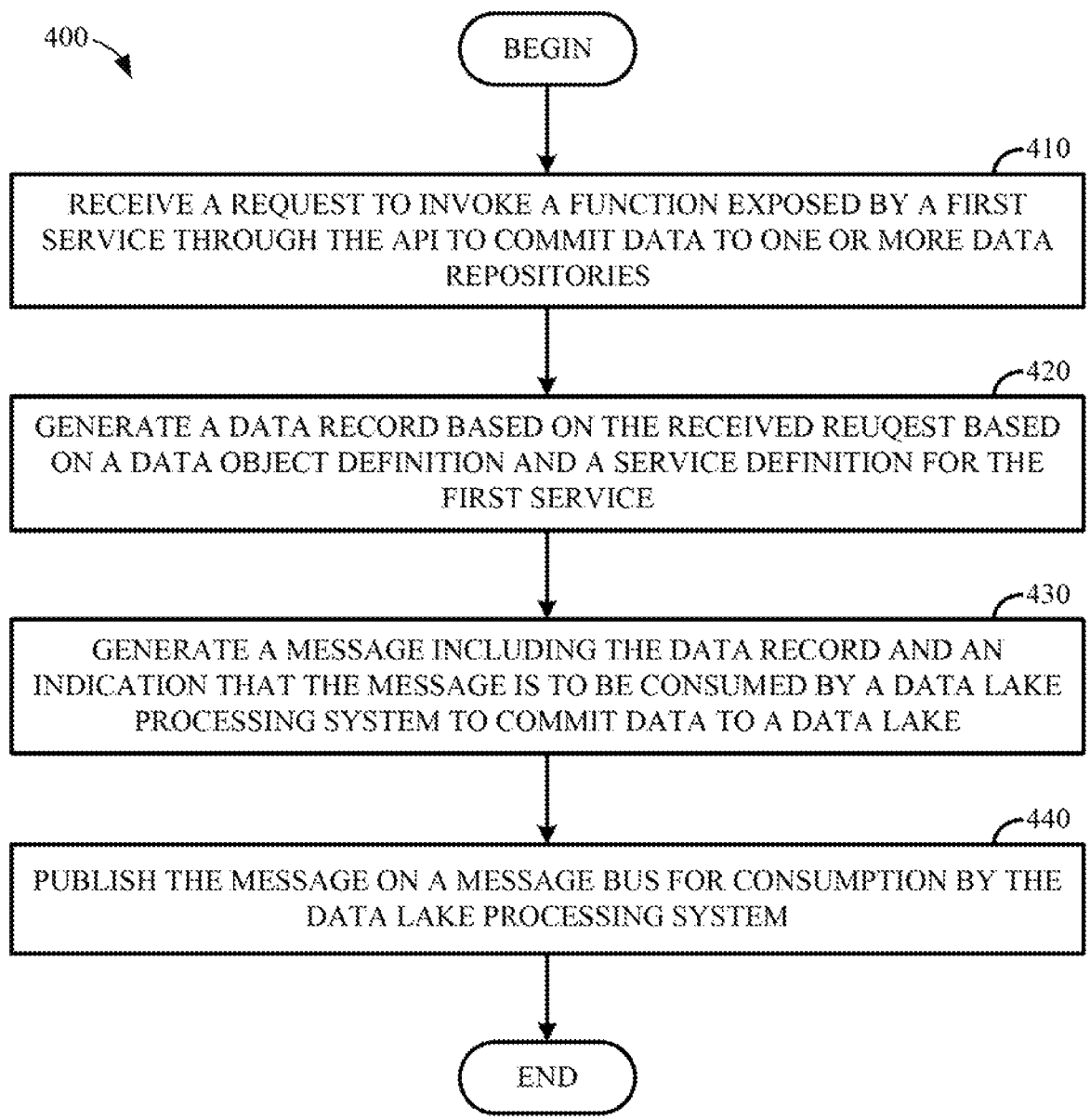
FIG. 4 depicts example operations for processing write (north-south) queries in an API based on declarative schemas for a service in a collection of services.

Example Processing of Write (North-South)
Queries in an Application Programming Interface
Generated Based on Declarative Schemas FIG. 4 illustrates example operations 400 for processing write (north-south) queries in an application programming interface generated based on declarative schemas for a service in a collection of services. The operations described herein may be performed, for example, by any of services 140A-140C illustrated in FIG. 1.

As illustrated, operations 400 begin at block 410, where a system receives a request to invoke a function exposed by a first service through an application programming interface. The application programming interface may be defined as a graph projection in which functions in the application programming interface are defined as navigable paths through the graph projection. The function may be a write function that, when executed, causes the first service to commit data to one or more data repositories. In some embodiments, the request may be received from a request gateway serving as a single point of entry into an application programming interface. In other embodiments, the request may be received as a message published on a message bus by another service in the application programming interface.

At block 420, the system generates a data record based on the received request and a data object definition and a service definition for the first service. To generate the data record, the system can process data included in the received request according to the service definition for the first service. The service definition may define one or more functions exposed by the first service that perform various calculations and/or modifications to the data included in the received request. After performing any processing on the data included in the received request specified in the service definition for the first service, the system can generate a data record according to a format identified in the data object definition for the first service.

At block 430, the system generates a message including the generated data record and an indication that the message is to be consumed by a data lake processing system to commit data to a data lake. In some embodiments, the message may further include versioning information identifying a version of the data object definition used to generate the data record. As discussed, the versioning information may be used by other applications to convert data stored in the data lake into a standard version for use in various operations, such as training a machine learning model, where a standard representation may be needed for performing various operations.

At block 440, the system publishes the message on a message bus for consumption by the data lake processing system. The message bus may represent an asynchronous messaging system in which messages may be published by the first service and later consumed by a consuming service. After the system publishes the message on the message bus, the system need not wait for a confirmation from the data lake that the data included in the message has been committed to the data lake. In some embodiments, the system may further commit the data record included in the message to a local data store (e.g., a data store associated with the first service). Future requests for the data record may be retrieved from the local data store instead of from the data lake. The data record stored at the local data store may be modified and/or deleted; however, the data record stored at the data lake may remain static, and updates to the data record in the local data store may be committed as separate data records in the data lake. In some embodiments, the system can publish a message on the message bus indicating that the request has been satisfied and that the service that generated the request can continue processing a data write operation.

Figure 5:
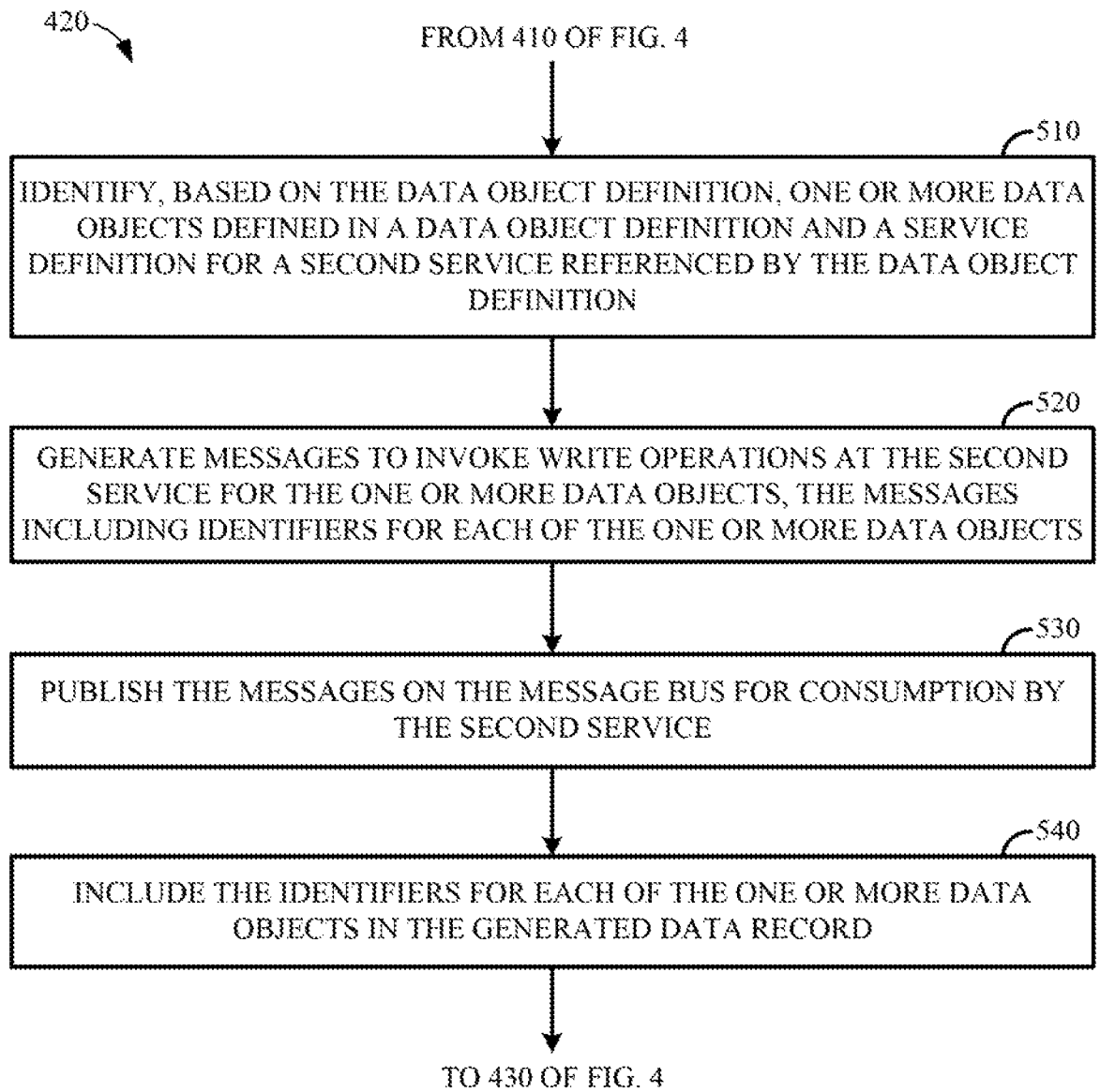
FIG. 5 depicts example operations for generating requests to instruct a plurality of services to write data objects referenced by an object written to a first service.

FIG. 5 illustrates further details of generating the data record based on the received request and a data object definition and a service definition for the first service in block 420 illustrated in FIG. 4. In this example, a data record generated in response to a request to invoke the function may reference one or more objects defined in a data object definition and a service definition for a second service in the application programming interface.

As illustrated, block 420 may begin at block 510, where the system identifies, based on the data object definition for the first service, one or more data objects defined in a data object definition and a service definition for a second service referenced by the data object definition for the first service.

At block 520, the system generates one or more messages to invoke write operations at the second service for the one or more data objects. In generating these one or more messages, the system can independently generate identifiers for the data objects (e.g., using sequential identifiers, identifiers generated using a hashing algorithm, etc.) and include these identifiers in the one or more messages.

At block 530, the system publishes the one or more messages on the message bus for consumption by the second service. As discussed, the system can publish the messages and need not wait for an acknowledgment or confirmation from the second service to continue executing the function invoked at the first service. The message may include, in a header or reserved portion of a payload of the message, an indication that the message is to be consumed by a date lake processor to commit data to the data lake.

At block 540, the system includes the identifiers for each of the one or more data objects in the data record generated by the first service. By including these identifiers in the data record generated by the first service, data may be written once to a data lake and/or service data store, which may minimize an amount of duplicated data in the computing environment.

Figure 6:
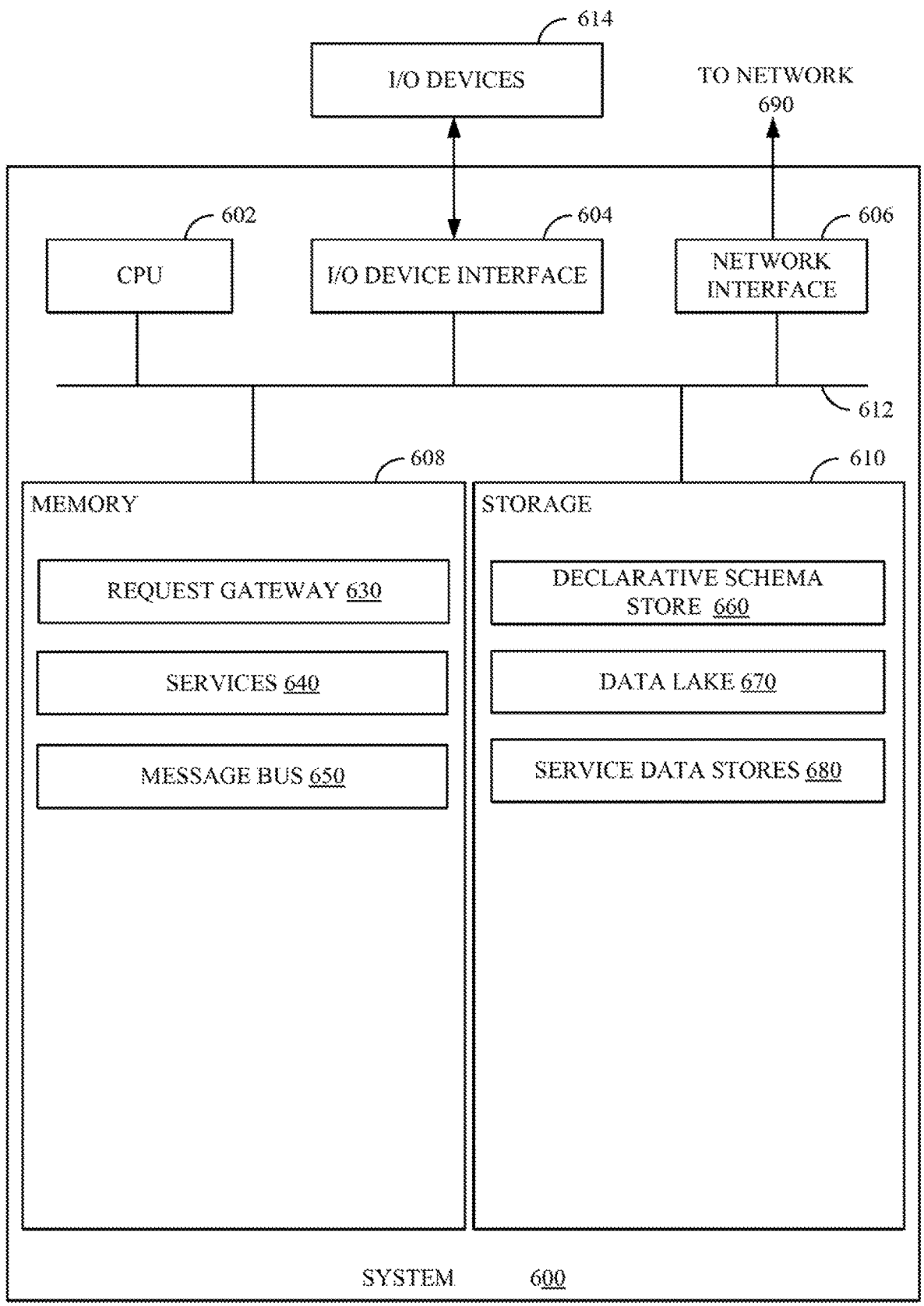
FIG. 6 depicts an example computing system on which embodiments of the present disclosure may be implemented.

Example Systems for Processing North-South
Queries in an Application Programming Interface
Generated Based on Declarative Schemas for
Services in a Collection of Services FIG. 6 illustrates an example system 600 that can process north-south queries in an API generated from declarative schemas for services in a collection of services. For example, system 600 may comprise one or both of request gateway 110 and/or one or more services 140A-140C illustrated in FIG. 1.

As shown, system 600 includes a central processing unit (CPU) 602, one or more I/O device interfaces 604 that may allow for the connection of various I/O devices 614 (e.g., keyboards, displays, mouse devices, pen input, etc.) to the system 600, network interface 606 through which client 600 is connected to network 690 (which may be a local network, an intranet, the internet, or any other group of computing devices communicatively connected to each other), a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 604, memory 608, and storage 610.

CPU 602 is included to be representative of a single CPU, multiple CPUs, a single CPU having multiple processing cores, and the like.

Memory 608 is representative of a volatile memory, such as a random access memory, or a nonvolatile memory, such as nonvolatile random access memory, phase change random access memory, or the like. As shown, memory 608 includes a request gateway 620, services 630, and message bus 640.

Request gateway 620 generally composes a graph projection of an API together from the declarative schemas defining each service in the API and exposes the graph projection of the API to external services or applications. Generally, the graph projection generated by request gateway 620 may include information about a variety of navigable paths through an API that may be traversed to perform a particular operation defined in the declarative schemas for the services. The graph projection may be periodically updated as new services are brought online and as updates are performed in respect of existing services in the API. Generally, request gateway 620 receives requests to invoke a function exposed by one of services 630 (e.g., synchronously via a RESTful call or asynchronously via a message placed on message bus 640) and routes the request to the appropriate service 630 for processing.

Services 630 are generally representative of programs or other application code that executes on system 600 to implement functionality defined by the declarative schemas and exposed to external services or applications by request gateway 620. Generally, services 630 may receive a request from an external service or application via request gateway 620 based on information in the graph projection identifying the service response for handling of a request. To process a north-south request, services 630 generally generate a message including a data record to be written to a data lake and place the generated record on the message bus 640 for consumption by the data lake 670 or a processor associated with the data lake 670 (e.g., to commit data to the data lake 670). In some embodiments, where a data record to be written includes data objects associated with other services, services 630 can place a message on the message bus 640 for consumption by these other services to instruct these services to write the objects to a service data store and to the data lake 670.

Storage 610 is representative of a non-volatile memory, such as a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN). Storage 610, as illustrated, may include a declarative schema store 660, a data lake 670, and service data stores 680. Declarative schema store 660 generally serves as a repository in which declarative schemas defining services 430 are stored. Data lake 670 generally serves as a repository in which data generated and maintained by the services 630 are stored for future retrieval. Service data stores 680 generally serve as service-specific data stores in which data may be stored for retrieval and use by the services 640.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for processing requests in an application programming interface (API), comprising:
   receiving a request to invoke a function exposed by a first service through the API, wherein:
      the function commits data to one or more data repositories, and
      the request is received as a first message on a message bus from another service;
   generating, by the first service, a data record based on the received request based on a data object definition and a service definition for the first service, wherein generating the data record comprises generating one or more data records associated with objects defined in a data object definition and a service definition for a second service referenced by the data object definition by:
      identifying, from the data object definition and the service definition for the first service, one or more references to objects defined in the data object definition and the service definition for the second service; and
      publishing a data object write message on the message bus for consumption by the second service, wherein the data object write message instructs the second service to generate and commit records associated with the referenced objects to a data repository associated with the second service;
   generating a second message including the generated data record and an indication that the message is to be consumed by a data lake processing system to commit data to a data lake;
   publishing the second message on the message bus for consumption by the data lake processing system; and
   publishing a third message on the message bus, intended for the other service, indicating that the request has been satisfied and that the other service can continue processing a data write operation.

2. The method of claim 1, wherein the second message includes versioning information identifying a version of the data object definition used in generating the data record.

3. The method of claim 1, further comprising: committing the data record to a local data store associated with the first service such that future requests for the data record are retrieved from the local data store associated with the first service and not from the data lake and data stored in the data lake is used outside of an operating environment in which the API is deployed.

4. The method of claim 1, wherein:
   the data object write message comprises a batch write instruction to instruct the second service to write a plurality of records to the data repository associated with the second service; and
   the method further comprises:
      receiving, from the second service, identifiers of the plurality of records written to the data repository associated with the second service, and
      inserting the received identifiers into the generated data record such that the plurality of records written to the data repository associated with the second service are not duplicated in the data lake.

5. The method of claim 1, wherein the API comprises a graph projection composed from schemas defining a plurality of services exposed by the API.

6. A system, comprising:
   a memory having executable instructions stored thereon; and
   a processor configured to execute the executable instructions to cause the system to:
      receive a request to invoke a function exposed by a first service through an application programming interface (API), wherein:
         the function commits data to one or more data repositories, and
         the request is received as a first message on a message bus from another service;
      generate, by the first service, a data record based on the received request based on a data object definition and a service definition for the first service, wherein in order to generate the data record, the processor is configured to cause the system to generate one or more data records associated with objects defined in a data object definition and a service definition for a second service referenced by the data object definition by causing the system to:
         identify, from the data object definition and the service definition for the first service, one or more references to objects defined in the data object definition and the service definition for the second service, and
         publish a data object write message on the message bus for consumption by the second service, wherein the data object write message instructs the second service to generate and commit records associated with the referenced objects to a data repository associated with the second service;
      generate a second message including the generated data record and an indication that the message is to be consumed by a data lake processing system to commit data to a data lake;
      publish the second message on the message bus for consumption by the data lake processing system; and
      publish a third message on the message bus, intended for the other service, indicating that the request has been satisfied and that the other service can continue processing a data write operation.

7. The system of claim 6, wherein the second message includes versioning information identifying a version of the data object definition used in generating the data record.

8. The system of claim 6, wherein the processor is further configured to cause the system to commit the data record to a local data store associated with the first service such that future requests for the data record are retrieved from the local data store associated with the first service and not from the data lake and data stored in the data lake is used outside of an operating environment in which the API is deployed.

9. The system of claim 6, wherein:
   the data object write message comprises a batch write instruction to instruct the second service to write a plurality of records to the data repository associated with the second service; and the processor is further configured to cause the system to:
receive, from the second service, identifiers of the plurality of records written to the data repository associated with the second service, and insert the received identifiers into the generated data record such that the plurality of records written to the data repository associated with the second service are not duplicated in the data lake.

10. The system of claim 6, wherein the API comprises a graph projection composed from schemas defining a plurality of services exposed by the API.

11. A method for processing requests in an application programming interface (API), comprising:
receiving a request to invoke a first function exposed by a first service through the API, wherein the function is configured to commits data to one or more data repositories;
publishing an object write message on a message bus to invoke a second function to generate one or more data records associated with objects defined in a data object definition and a service definition for a second service referenced by the data object definition, wherein the object write message comprises a batch write instruction to instruct the second service to write a plurality of records to the data repository associated with the second service;
receiving, from the second service, identifiers of the generated one or more data records in a message consumed on the message bus;
generating a data record based on the received request, a data object definition and a service definition for the first service, and the identifiers of the generated one or more data records associated with objects defined in the data object definition and the service definition for the second service, wherein generating the data record comprises generating one or more data records associated with objects defined in a data object definition and a service definition for a second service referenced by the data object definition by:

identifying, from the data object definition and the service definition for the first service, one or more references to objects defined in the data object definition and the service definition for the second service; and publishing a data object write message on the message bus for consumption by the second service, wherein the data object write message instructs the second service to generate and commit records associated with the referenced objects to a data repository associated with the second service;

generating a message including the generated data record, an indication that the message is to be consumed by a data lake processing system to commit data to a data lake, and versioning information identifying a version of the data object definition used in generating the data record; and publishing the message on the message bus for consumption by the data lake processing system.

12. The method of claim 11, further comprising: committing the generated data record to a local data store associated with the first service such that future requests for the generated data record are retrieved from the local data store associated with the first service and not from the data lake and data stored in the data lake is used outside of an operating environment in which the API is deployed.

13. The method of claim 11, wherein the API comprises a graph projection composed from schemas defining a plurality of services exposed by the API.

14. The method of claim 1, wherein the data object definition references a data object defined by a different data object definition such that the referenced data object is not duplicated in the generated data record.

15. The system of claim 6, wherein the data object definition references a data object defined by a different data object definition such that the referenced data object is not duplicated in the generated data record.

16. The method of claim 11, wherein the data object definition references a data object defined by a different data object definition such that the referenced data object is not duplicated in the generated data record.

* * * * *